United States Patent Office 3,536,725
Patented Oct. 27, 1970

3,536,725
CYANOETHYLATED DERIVATIVES OF 2,3,4,6,7,12-HEXAHYDROINDOLO[2,3-α]-QUINOLIZINE
Robert Norman Schut, Edwardsburg, Mich., assignor to Miles Laboratories, Inc., Elkhart, Ind., a corporation of Indiana
No Drawing. Filed Nov. 22, 1967, Ser. No. 684,915
Int. Cl. C07d 31/46
U.S. Cl. 260—294.9                    4 Claims

ABSTRACT OF THE DISCLOSURE

A series of cyanoethylated derivatives of 2,3,4,6,7,12-hexahydroindolo[2,3-a]quinolizine that are useful as intermediates in the synthesis of Eburnamine alkaloid analogs. These compounds are prepared by reacting acrylonitrile with 2,3,4,6,7,12-hexahydroindolo[2,3-a]-quinolizine.

---

This invention relates to a novel series of chemical compounds. More particularly, this invention relates to cyanoethylated derivatives of 2,3,4,6,7,12-hexahydroindolo[2,3-a]quinolizine beneficially formed as intermediates in the preparation of Eburnamine alkaloid analogs and a process for the preparation thereof.

The novel compounds of this invention may be prepared by reacting 2,3,4,6,7,12-hexahydroindolo[2,3-a]-quinolizine with a preselected quantity of acrylonitrile. Although reaction conditions are not considered critical, a solvent is beneficially used that is unreactive under the reaction conditions. The reactants are preferably stirred at room temperature for an extended period of time, such as, between about 12 and 16 hours to allow the reaction to go to completion. With an approximately equal molar quantity of acrylonitrile and 2,3,4,6,7,12-hexahydroindolo[2,3-a]quinolizine as reactants a 1-(2-cyanoethyl)-2,3,4,6,7,12-hexahydroindolo[2,3-a]quinolizine is formed. Under similar reaction conditions but with a substantial excess molar quantity of acrylonitrile as compared to the quantity of 2,3,4,6,7,12-hexahydroindolo[2,3-a] quinolizine a bis-1,1-(2-cyanoethyl)-1,2,3,4,6,7-hexahydropseudoindolo[2,3-a]quinolizine is prepared.

The novel compound bis-1,1-(2-cyanoethyl)-1,2,3,4,6,7-hexahydropseudoindolo[2,3-a]quinolizine may be further reacted with a slight excess of HCl in isopropyl alcohol to form a chloride salt, bis-1,1-(2-cyanoethyl)-1,2,3,4,6,7-hexahydro-12H-indolo[2,3-a]quinolizinium chloride. The reaction conditions for the preparation of the specific compounds are set forth in the detailed examples.

The novel compound 1-(2-cyanoethyl)-2,3,4,6,7,12-hexahydroindolo[2,3-a]quinolizine may be represented by the structural formula:

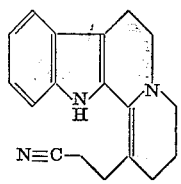

The structure of this compound is not to be limited by the above formula, however, as it is postulated that this compound may exist in tautomeric equilibrium with a compound of the structural formula:

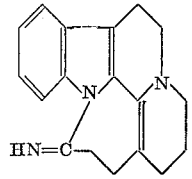

The new compound bis-1,1-(2-cyanoethyl)-1,2,3,4,6,7-hexahydropseudoindolo[2,3-a]quinolizine may be represented by the structural formula:

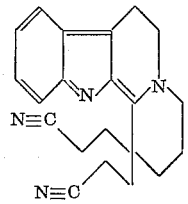

The chloride salt, bis-1,1-(2-cyanoethyl)1,2,3,4,6,7-hexahydro-12H-indolo[2,3-a]quinolizinium chloride may be represented by the structural formula:

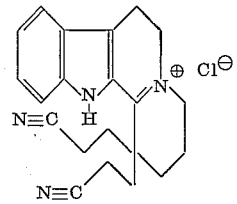

The novel compounds of this invention are useful as intermediates in the synthesis of Eburnamine alkaloid analogs. The compound 1-(2-cyanoethyl)-2,3,4,6,7,12-hexahydroindolo[2,3-a]quinolizine may be reacted to affect ring closure followed by hydrolysis to form an Eburnamine alkaloid derivative of the formula:

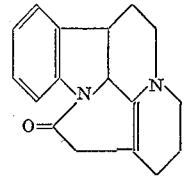

These hexahydro-1,2-trimethyleneindolo[2,3-a]quinolizines may be reduced to form a more highly saturated octahydro-1,12-trimethyleneindolo[2,3-a]quinolizine. The latter compounds have been observed as useful as analgesics and monoamine oxidase inhibitors.

The invention will be further understood by reference to the following examples which describe specific compounds of the invention and processes for the preparation thereof. These examples are intended to be representative of the invention and not to limit the scope of the same which is properly set forth in the appended claims.

EXAMPLE I 1-(2-cyanoethyl)-2,3,4,6,7,12-hexahydroindolo[2,3-a] quinolizine

To a suspension of 11.2 g. (0.050 mole) of 2,3,4,6,7,12-hexahydroindolo[2,3-a]quinolizine in 200 ml. of MeOH was added dropwise a solution of 2.90 g. (0.055 mole) of acrylonitrile in 50 ml. of MeOH. The mixture was stirred at room temperature for 16 hours. During this time all the solid material went into solution. After concentration of the MeOH, the residue was chromatographed on 200 g. of neutral alumina using benzene-chloroform (1:1) as eluent. Four 500-ml. fractions were collected; fractions 2 and 3 were stirred with ether to give 4.68 g. of yellow crystalline solid, M.P. 144–147° C. Recrystallization from a large volume of ether gave 3.18 g. of canary yellow solid, M.P. 156–157° C.;

$\nu_{max.}^{CHCl_3}$ 3500 and 3430(NH), 2250(C≡N), 1630 and 1615 cm.$^{-1}$; $\lambda_{max.}^{MeOH}$ 212($\epsilon$ 17,500), 249($\epsilon$ 10,800) and 360 m$\mu$ ($\epsilon$ 19,000);

$\lambda_{max.}^{MeOH}$ neut. 213($\epsilon$ 22,900), sh. 231($\epsilon$ 13,800) and 311 m$\mu$($\epsilon$ 10,200)

*Analysis.*—Calcd. for $C_{18}H_{19}N_3$ (percent): C, 77.93; H, 6.90; N (basic), 5.05; N (total), 15.15. Found (percent): C, 78.00; H, 7.05; N (basic), 5.06; N (total), 15.01 (Kjeldahl).

EXAMPLE II bis-1,1-(2-Cyanoethyl)-1,2,3,4,6,7-hexahydro-pseudoindolo[2,3-a]-quinolizine To a stirred solution of 200 ml. of acrylonitrile and 150 ml. of dry THF was added 11.2 g. of 2,3,4,6,7,12-hexahydroindolo[2,3-a-quinolizine. The solution was stirred at room temperature overnight, a small amount of insoluble material was filtered and the filtrate was concentrated in vacuo. The reside was stirred with ether to give 12.5 g. of red-orange colored solid, M.P. 142–150° C. A salt was formed from ethyl acetate-methanol —HCl. The salt was dissolved in water and the free base precipitated by addition of NaOH solution. The product was collected and recrystallized from acetone, M.P. 186–187° C.;

$\nu_{max.}^{KCl}$ 2250 (C≡N), 1630 (m.), 1560 and 1500 cm.$^{-1}$ $\lambda_{max.}^{MeOH}$ neut. 220 (25,400), sh. 255 (7920), 390 (11,500) and ca. 550 m$\mu$ tailing off at $\epsilon$35,000.

The N.M.R. spectrum (10% DMSO) showed no indole N—H. There were 4 olefinic protons in the region $\tau$=2.5–3.4 p.p.m.

*Analysis.*—Calcd. for $C_{21}H_{22}N_4$ (percent: C, 76.36; H, 6.73; N, 16.97. Found: C, 75.55; H, 6.82; N, 16.68.

EXAMPLE III bis-1,1-(2-Cyanoethyl)-1,2,3,4,6,7-hexahydro-12H-indolo[2,3-a]]-quinolizinium chloride A 5.9 g. sample of bis-1,1-(2-cyanoethyl)-1,2,3,4,6,7-hexahydropseudoindolo[2,3-a]quinolizine was suspended in warm ethyl acetate and treated with a slight excess of HCl in isopropyl alcohol. Methanol was added to dissolve the solid and the solution was clarified with charcoal. The filtrate was concentrated until solid began to appear. The salt was collected (2.9 g.) and recrystallized from methanol-ethyl acetate; M.P. 268–270° C. (dec.). The infrared spectrum showed no

absorption was present at 2250 (C≡N), 1620, 1605, 1525 and 1340 cm.$^{-1}$. The ultraviolet spectrum (MeOH) showed maxima at 207.5 (19,600), 248 (7040) and 365 m$\mu$ (16,800). The N.M.R. spectrum (10% DMSO) showed indole N—H at $\tau$=3.02 p.p.m. and 4 aromatic protons in the region $\tau$=2.0–2.8 p.p.m.

*Analysis.*—Calcd. for $C_{21}H_{22}N_4$·HCl: C, 68.66; H, 6.32; N, 15.26. Found: C, 68.79; H, 6.53; N, 14.89.

What is claimed is:

1. A cyanoethylated derivative of 2,3,4,6,7,12-hexahydroindolo[2,3-a]quinolizine selected from the group consisting of compounds of the formula:

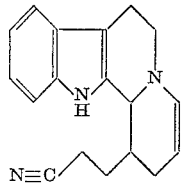

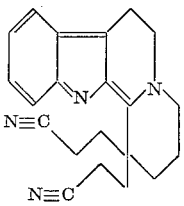

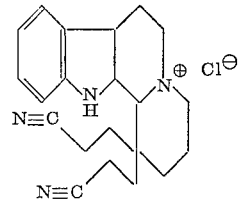

2. A compound according to claim 1 which is 1-(2-cyanoethyl) - 2,3,4,6,7,12 - hexahydroindolo[2,3-a]quinolizine.

3. A compound according to claim 1 which is bis-1,1-(2 - cyanoethyl) - 1,2,3,4,6,7 - hexahydropseudoindolo [2,3-a]quinolizine.

4. A compound according to claim 1 which is bis-1,1-(2 - cyanoethyl) - 1,2,3,4,6,7-hexahydro-12H-indolo[2,3-a]quinolizium chloride.

References Cited

UNITED STATES PATENTS 3,087,930   4/1963   Schut _____ 260—296 XR

HENRY R. JILES, Primary Examiner

A. L. ROTMAN, Assistant Examiner

U.S. Cl. X.R.

260—239.3, 293, 296; 424—244